Feb. 28, 1967
E. A. ERICSSON
3,306,982
LEVEL CONTROL DEVICE
Filed March 15, 1963
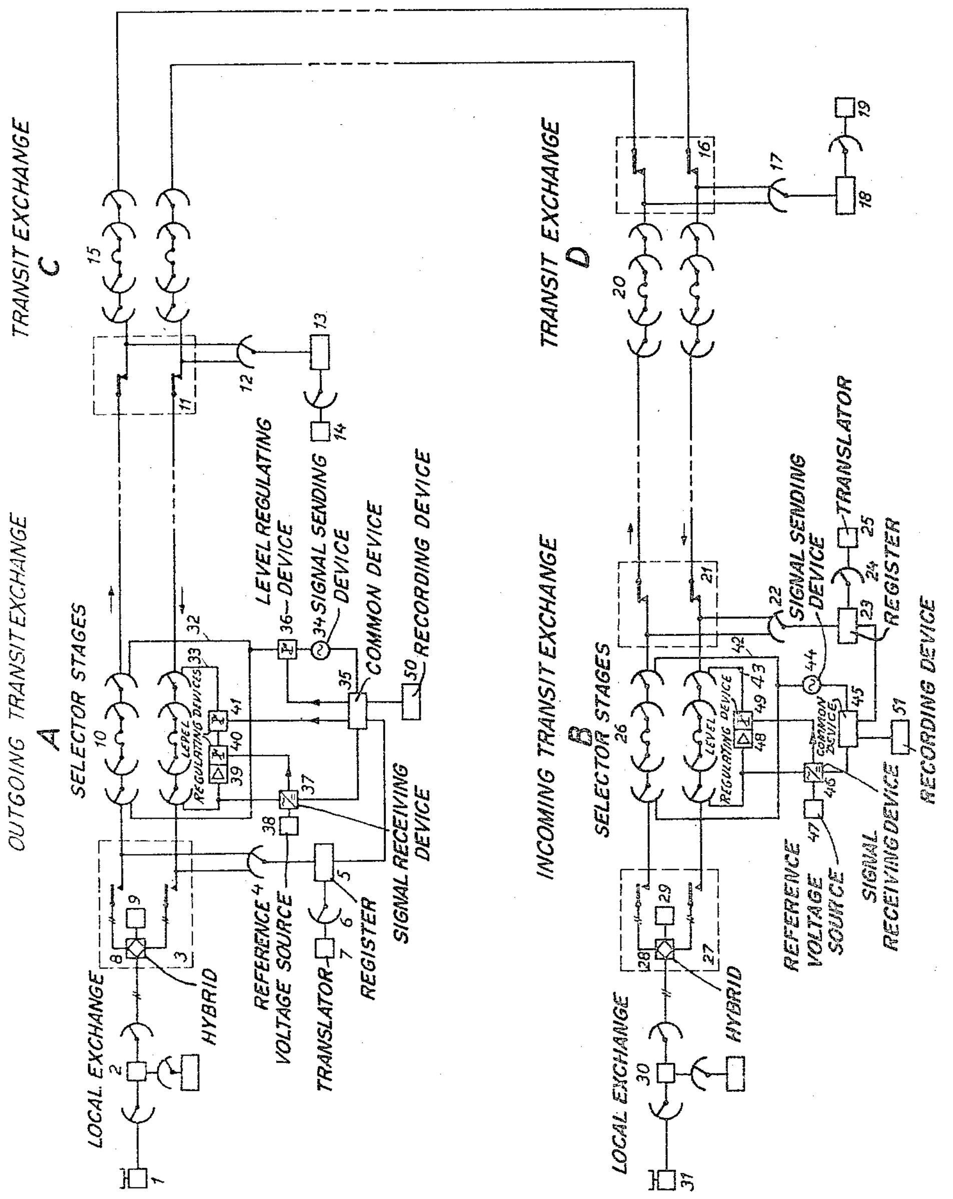
INVENTOR
ERIC ARVID ERICSSON
BY Hane and Nydick
ATTORNEYS

United States Patent Office 3,306,982

Patented Feb. 28, 1967

3,306,982

LEVEL CONTROL DEVICE

Eric Arvid Ericsson, Stockholm, Sweden, assignor to Telefonaktiebolaget L M Ericsson, Stockholm, Sweden, a corporation of Sweden Filed Mar. 15, 1963, Ser. No. 265,546
Claims priority, application Sweden, Mar. 30, 1962, 3,577/62
4 Claims. (Cl. 179—16)

The present invention refers transit to telecommunication systems, and more particularly to such systems in which long distance connections comprise a number of four-wire sections interconnected in series between two local two-wire networks, and in which four-wire repeaters are connected in both transmission directions.

On the four-wire sections of such systems, echo, stability and a certain least overall attenuation must be taken into consideration. In practical operation it must be taken into consideration that the overall attenuation has a statistical distribution around determined medium values. In a series connection of a number of four-wire sections a statistical addition of attenuation divergences is thus obtained, which means that for different calls between two places positive or negative total divergences from determined medium value sums are obtained. In order to prevent negative total divergences from causing instability or inconvenient echo it is therefore necessary to increase the minimum overall attenuation for every four-wire circuit by certain amounts. This means a deterioration of the call quality, which then will be further deteriorated if positive attenuation divergences are obtained. This is especially so for calls carried over many four-wire sections connected in series. For successive calls between two particular subscribers attenuation divergences of many tens of decibels may occur, which annoys the subscribers and causes complaints. These problems will be more acute as the automation of the long distance traffic increases, and the subscribers themselves connect the calls. One way of overcoming such difficulties is to decrease the overall attenuation distribution on all four-wire sections. This, however, would increase operation supervision and maintenance. The costs for such a standard improvement of a comparatively small number of expensive telephone communications are considerable and in addition to this the difficulty arises of maintaining a set standard of quality in, for instance, an international four-wire network divided in many telephone administrations.

According to the present invention, there is provided a telecommunication systems arrangement comprising an outgoing and an incoming tandem exchange, a four-wire connection including two speech directions connected between said outgoing and incoming tandem exchanges and local two-wire connections connected to both said outgoing and said incoming tandem exchanges, said tandem exchanges each comprising a register for receiving and storing digital information, a number translator connected to said register for determining a nominal overall attenuation of said four-wire connection by means of received digital information fed to it by said register, and selector stages, said selector stages comprising special links including measuring and regulating devices for measuring and regulating the overall atenuation of the two speech directions of said four-wire connection, said measuring and regulating devices in said incoming tandem exchange comprising a signal receiving device connected in series with a regulating device to the line pair in the forward direction of said four-wire connection as seen from said outgoing tandem exchange and a signal sending device connected to the line pair in the backward direction for sending a signal with a reference level fixed for the backward direction, and in said outgoing tandem exchange comprising a signal receiving device connected in series with a regulating device to the line pair in the backward direction of said four-wire connection and a signal sending device connected in series with a regulating device to the line pair in the forward direction of said four-wire connection for sending a signal with a reference level fixed for the forward direction but adusted by said nominal overall attenuation value determined by said translator; and in each tandem exchange a common device connected to said register, said signal sending device, said signal receiving device and said regulating device, for operating said sending, receiving and regulating devices.

The invention will be further described with the help of the accompanying drawing, which shows an example of an embodiment according to the invention. A four-wire connection from an outgoing transit exchange A to an incoming transit exchange B is shown in the drawing. In the four-wire connection a number of further transit exchanges are inserted, two of which being indicated, C and D. The transit exchange A is through a hybrid 8 in an incoming line repeater 3 connected to a local network represented by a local exchange 2 in the drawing, and a subscriber 1 connected thereto. In the hybrid 8 a line balance 9 is also inserted. In the same way the transit exchange B is connected through a hybrid 28 having a line balance 29 in an outgoing line repeater 27 to another local network represented in the drawing by a local exchange 30, and a subscriber 31 connected to this local exchange 30.

When establishing a telephone connection from the subscriber 1 to the subscriber 31 the outgoing transit exchange A is called from the register in the local exchange 2. In the exchange A a register 5 is connected to the incoming line repeater 3 over a register finder 4. In the register 5 all digital information, the routing number as well as subscriber's number, are obtained and registered. After the register 5 has received the digital information it connects through a connecting device 6 to a number translator 7 which is of known kind. Translator 7 is programmed so that it can decide from the received routing number if level control is to be made or not on the four-wire connection that is to be established. If level control is not necessary this is signalled from the translator 7 to the register 5 which thereupon disconnects the translator and completes the establishment of the connection.

If, however, level control is to be made, this is signalled to the register 5, which then connects special links 32 and 33 to the selector stage 10 of the exchange A, which links comprise measuring and regulation devices. To the link 32 a signal-sending device 34 can be connected and to the link 33 a signal-receiving device 37 can be connected. From the number translator 7 in which has not only determined that level control is to be effected, but also what nominal overall attenuation is to be for the intended connection, a number value is sent which corresponds to the nominal overall attenuation to a device 35, in which this value is recorded. The translator 7 is thereafter disconnected.

The register 5 completes the establishment of the call and forwards the number information to the following transit exchanges according to established techniques appropriate to the system. In the transit exchanges, for instance in exchange C, the routing number is fed to the register 13 through the register finder 12 and the incoming line repeater 11. The register 13 is then connected to the number translator 14. The routing number is analyzed and an answer is given that level control is to be effected in some following exchange. The translator 14 is disconnected and connection through the selector stage 15 is effected. In the same way the routing number is fed in the exchange D to the register 18 through register finder 17 and incoming line repeater 16. The register 18 connects to the translator 19, which after analysis of the routing number indicates that level control is to be made in some following station. The translator 18 is disconnected and connection through the selector stage 20 is effected.

When the connection reaches incoming exchange B the register 23 in this exchange is connected over the incoming line repeater 21 and the register finder 22 to receive the number information. The register 23 is then connected to a translator 25 through a connection device 24. The translator indicates that level control is to be effected. For this purpose two measuring links 42 and 43 are connected to the selector stage 26 of the exchange B. To the link 42 as signal sending device 44 is connected and to the link 43 a signal receiving device 46. The signal sender 44 and the signal receiver 46 are further connected to a connection device 45 which is also connected to the register 23. After the measuring links have been connected to the selector stages the translator 25 is disconnected.

The level control can be started when the number translator 25 in the exchange B has received the complete subscriber's number. In order to minimize holding time of equipment, as much as possible of the digital information should be transmitted to the register on the exchange B before the measuring starts. It is then possible to effect level measuring during the time which is necessary for setting up a connection through the called network. The level control is started by the device 45 in the exchange B operating the signal sender 44, which over the link 42 through the selector stage 26 sends a telemetering signal of determined frequency and reference level over the line pair of the four-wire connection in the backward direction. The signal passes all exchanges and is finally received by the signal receiver 37 connected to the link 33 in exchange A, in which receiver it is compared to a reference value from a voltage source 38. The signal receiver 37 is responsive, when this comparison shows divergences from the reference value to adjust the attenuation of an adjustable attenuator 40, which is interconnected in the link 33, in series with an amplifier 39 with constant amplification. The attenuator 40 thereby adjusts the level to the reference value. The value of the nominal attenuation of the connection determined by the translator 7 is as mentioned in the foregoing recorded in the device 35. The device 35 now influences one more adjustable attenuator 41 connected in the link 33, which attenuator is adjusted to a value corresponding to the nominal attenuation of the connection.

When the exchange A receives telemetering signal from the exchange B a telemetering signal of determined frequency and reference level is sent over the line pair of the four-wire connection in the forward direction from the signal sender 34 connected to the link 32. The exchange A can alone decide what attenuation there is to be in the forward direction of the connection. For adjustment of this an adjustable attenuator 36 is interconnected in series with the signal sender 34, and this attenuator can be influenced by the device 35. The attenuator 36 is adjusted by the device 35 to a value corresponding to the nominal attenuation of the connection. Thus the level of the telemetering signal in the forward direction is increased to a value that is needed for the right reference value to be obtained at the incoming station. In the exchange the telemetering signal is received by the signal receiver 46 connected to the link 42 and is compared to a reference value from a reference voltage source 47. When this comparison shows divergences from the reference value an adjustable attenuator 49, interconnected in the link 43, is influenced, which attenuator is connected to an amplifier 48 with constant amplification. The attenuator 49 thereby adjusts the level to a value corresponding to the reference value. As in the exchange A, a connection of the nominal attenuator value is made to determine an overall attenuation value for the forward direction.

When the exchange B receives telemetering signal from the exchange A the telemetering signal sent towards the A exchange is broken and this in turn breaks the telemetering signal sent totwards the B exchange. The measuring and signal devices are disconnected and only amplifiers and attenuators lie in the links 33 and 43 in the four-wire connection. The establishment of the connection is thereafter completed so that the subscriber, through the local exchange 2 in the incoming line repeater, is connected to the outgoing end of the four-wire connection and the subscriber 31, through the local exchange 30 in the outgoing line repeater 27, is connected to the incoming end of the four-wire connection. The registers 5 and 23 are thereafter disconnected.

As an incoming transit exchange does not know if an incoming call is to be level controlled, but blindly decides when level control is to be effected, telemetering signal is thus sent towards the outgoing transit exchange if needed or not. If a test is not needed, the outgoing transit exchange does not answer with a telemetering signal in a few milliseconds, which, by the incoming station, is understood to mean that a test is not needed. The measuring links 42 and 43 are thereby disconnected.

Of course it is also possible to let the outgoing station start the test, but in that case an extra signal is needed in the backward direction stating that the test can start and extra signals in the forward direction to state if test is to be effected or not. Such a procedure may cause signal complications.

The signal receivers 37 and 46 are provided with inlet filters, having a band width that is small in relation to the band width of the speech channel, so that noise on the four-wire lines will not disturb the level test.

The advantage of the level control device described in the foregoing is that the nominal overall attenuation for the four-wire connection is fixed with the help of the routing number. The subscribers therefore practically always receive the same four-wire attenuation in both directions, independently of which transmission connection is used and the number of four-wire sections connected in series, which is very important in a complicated four-wire network with selection of alternative connections.

It may now occur that an addition of the tolerance, chosen at random, to determine attenuation is so large that the regulating devices are not enough. The device 35 is thereby connected to a registration device 50, which for instance comprises a punched-card machine. On punched-cards the routing number is registered, which number is obtained from the register 5 and overall attenuation value which is obtained from the device 35. In every outgoing transit exchange is therefore obtained such information that, after a statistical treating, provides an indication of transmission quality. Corrections with comparatively small total level divergences after the regulation may, however, after wrong registration be accepted, while calls with large divergences are disconnected by the register 5, which thereafter establishes a new connection. The level control device on outgoing transit exchange will thus serve as an automatic sorting device. This permits a larger attenuation distribution on special sections of a connection, which is favourable from a maintenance point of view without the subscribers being subjected to a deterioration of connection quality. If the number of rejections is too large, this is statistically noted by the outgoing transit exchange, and an extra piece of information is inserted in the translator 7, which piece of information is transmitted to the device 25 together with the overall attenuation information. By this is obtained that when the next connection is established in a certain direction and too large an overall attenuation divergence is obtained, the established connection is not disconnected but the connection is locked up between the devices 35 and 45. The register 5 thereafter connects the subscribers over another four-wire connection. The locked connection causes an alarm in the outgoing transit exchange. The maintenance staff in all transit exchanges affected can be called to examine where the fault is situated.

As the same four-wire equipments are utilized for all kinds of calls the individual control of certain expensive calls means that these are individually regulated to continuous and good quality, that a statistical control of all four-wire connections is obtained and that the quality supervision and fault remedying in long ditsance connections passing a plurality of telephone administrations is facilitated.

The invention is of course not limited to the exemplary embodiment described in the foregoing in connection with the accompanying drawing, but the level control device may be varied with regard to the structure and to the units in the transit exchanges, without departing from the principle of the invention.

I claim:

1. An arrangement in a telecommunication system, said system comprising an outgoing and an incoming transit exchange, a four-wire connection including two speech directions adapted to be automatically connected between said outgoing and incoming exchanges and local two-wire connections adapted to be automatically connected to said outgoing and incoming exchanges, said exchanges comprising a register for receiving and storing digital information, means connected to said register for determining a nominal overall attenuation of said four-wire connection by means of the received digital information, and selector stages, said selector stages comprising special links including measuring and regulating devices for measuring and regulating the overall attenuation of the two speech directions of said four-wire connection, said measuring and regualting devices in said incoming exchange comprising a signal receiving device, a regulating device connecting said signal receiving device to the line pair in the forward direction of said four-wire connection seen from the outgoing exchange and a signal sending device connected to the line pair in the backward direction for sending a signal with a reference level fixed for the backward direction, and in said outgoing exchange comprising a signal receiving device, a regultaing device connecting said signal receiving device to the line pair in the backward direction of said four-wire connection and a signal sending device, a regulating device connecting said signal sending device to the line pair in the forward direction of said four-wire connection for sending a signal with a reference level fixed for the forward direction increased with said nominal overall attenuation value determined by said attenuation determining means; and in the respective exchanges a common device connected to said register, said signal sending device, said signal receiving device and said regulating device, for operating said sending, receiving and regulating devices.

2. An arrangement according to claim 1, in which said signal receiving devices have input filters the bandwidth of which is much smaller than the bandwidth of the speech channel.

3. An arrangement according to claim 1, in which said measuring and regulating devices comprise in the outgoing exchange an amplifier with constant amplification connected to the line pair in the backward direction of the four-wire connection seen from the outgoing exchange, a level sensitive signal receiver connected to the input of said amplifier, the output of said signal receiver being connected to a first adjustable attenuator connected to the output of said amplifier for adjusting a received signal level to said determined reference value, a second adjustable attenuator operable by said common device and connected in series with said amplifier and said first attenuator for increasing the level with the nominal overall attenuation value to the adjusted reference level, a third attenuator operable by said common device connected to the line pair in the forward direction, a signal generator in series with said third attenuator, said third attenuator increasing the send signal level with the nominal overall attenuation and in the incoming exchange an amplifier with constant amplification connected to the line pair in the forward direction of the four-wire connection, a level sensitive signal receiver conected to the input of said amplifier, an attenuator connected to the output of said amplifier for adjusting a received signal level to the determined reference value and a signal generator connected to the line pair in the backward direction of the four-wire connection and the output of said signal receiver being connected to said attenuator.

4. An arrangement according to claim 1, in which in said outgoing and incoming exchanges a registration device is connected to said common device in the respective exchanges for recording four-wire connections having unacceptable divergences in overall attenuation.

References Cited by the Examiner

UNITED STATES PATENTS

| | | | |
|---|---|---|---|
| 2,060,843 | 11/1936 | Abraham et al. | 179—170 |
| 2,224,569 | 12/1940 | Dickieson | 179—170 |
| 2,300,415 | 11/1942 | Green | 179—170 |
| 2,768,353 | 10/1956 | Mansson | 179—170 |

KATHLEEN H. CLAFFY, *Primary Examiner.*

WILLIAM G. COOPER, *Examiner.*